US007558582B2

(12) United States Patent  
Karlsson

(10) Patent No.: US 7,558,582 B2  
(45) Date of Patent: Jul. 7, 2009

(54) METHOD AND SYSTEM FOR COLLECTING AND SURVEYING RADIO COMMUNICATIONS FROM A SPECIFIC PROTECTED AREA OF OPERATIONS IN OR AROUND A COMPOUND

(75) Inventor: Lars Karlsson, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 688 days.

(21) Appl. No.: 11/303,601

(22) Filed: Dec. 15, 2005

(65) Prior Publication Data

US 2007/0173263 A1    Jul. 26, 2007

Related U.S. Application Data

(63) Continuation-in-part of application No. 10/829,858, filed on Apr. 21, 2004, now abandoned, and a continuation-in-part of application No. 11/201,164, filed on Aug. 11, 2005, and a continuation-in-part of application No. 11/201,144, filed on Aug. 11, 2005, now abandoned.

(60) Provisional application No. 60/637,402, filed on Dec. 17, 2004.

(51) Int. Cl.  
*H04Q 7/20* (2006.01)
(52) U.S. Cl. ............... 455/456.1; 455/404.2; 455/414.2
(58) Field of Classification Search ............. 455/456.1, 455/404.2, 414.1–415, 423, 456.2–456.6, 455/9, 67.11, 67.16; 370/241, 252, 465, 370/265; 342/417, 449, 123, 126, 139, 357; 375/130–135, 138, 139, 144–146, 344, 346, 375/350, 260, 262  
See application file for complete search history.

(56) References Cited

U.S. PATENT DOCUMENTS 6,036,351 A * 3/2000 Wagstaff ..................... 708/321

(Continued)

*Primary Examiner*—Pablo N Tran

(57) ABSTRACT

A Method and System for Collecting and Surveying Radio Communications From a Specific Protected Area of Operations in or Around a Compound. It is an object of the present invention to provide just such a method to automatically detect communications signals in near real time, from any selectable sub-area of a compound. Such a system would greatly enhance the operational capabilities of the twenty-first century organization by providing a real-time capability to secure radio communications in and around a compound. The system has all the abilities of the system described in the '976 application, but is further able to automatically detect the direction of the incoming signals (relative to two or more collector subsystems in communication with each other), and thereafter to add that information to the surveillance decision logic such that the actual geographical location, as adjusted by the calibration information for the particular compound surveillance decision logic. Secondly, the system has the capability of being calibrated such that the particular RF environment of the compound in question is uniquely mapped. The calibration tables maintained by each network-attached directional collection node of the system invention in order to provide a more robust and accurate signal geo-location system. Thirdly, the system is able to automatically pinpoint the geographic area of the source of the incoming signals and add that information to the monitoring decision logic. Finally, the system provides a user interface to operators so they can easily select areas to monitor, and easily calibrate the system for maximum precision.

17 Claims, 5 Drawing Sheets

U.S. PATENT DOCUMENTS

| | | | |
|---|---|---|---|
| 6,292,654 B1 * | 9/2001 | Hessel et al. | 455/223 |
| 6,335,953 B1 * | 1/2002 | Sanderford et al. | 375/344 |
| 6,542,743 B1 * | 4/2003 | Soliman | 455/436 |
| 6,735,264 B2 * | 5/2004 | Miller | 375/340 |
| 7,265,691 B2 * | 9/2007 | Tomic | 341/87 |
| 2002/0051498 A1 * | 5/2002 | Thomas et al. | 375/262 |
| 2002/0181721 A1 * | 12/2002 | Sugiyama et al. | 381/92 |
| 2003/0016823 A1 * | 1/2003 | Chung | 380/46 |
| 2003/0103589 A1 * | 6/2003 | Nohara et al. | 375/350 |
| 2004/0042568 A1 * | 3/2004 | Rowitch | 375/346 |
| 2004/0114772 A1 * | 6/2004 | Zlotnick | 381/92 |
| 2004/0243258 A1 * | 12/2004 | Shattil | 700/73 |
| 2005/0273483 A1 * | 12/2005 | Dent | 708/490 |
| 2006/0116578 A1 * | 6/2006 | Grunwald et al. | 600/440 |

* cited by examiner

Legend:
A – Area of interest
B, C – Areas to Monitor
R – Road
a, b, c, d – Buildings
1, 2, .. N – Directional receivers

METHOD AND SYSTEM FOR COLLECTING AND SURVEYING RADIO COMMUNICATIONS FROM A SPECIFIC PROTECTED AREA OF OPERATIONS IN OR AROUND A COMPOUND

This application is a continuation-in-part of application Ser. No. 10/829,858, filed Apr. 21, 2004 now abandoned, and Ser. No. 11/201,164, filed Aug. 11, 2005, and Ser. No. 11/201,144, filed Aug. 11, 2005 now abandoned.

This application is filed within one year of, and claims priority to Provisional Application Ser. No. 60/637,402, filed Dec. 17, 2004.

BACKGROUND OF THE INVENTION

1. Field of the Invention

This invention relates to electronic information surveillance and security systems and, more specifically, to a Method and System for Collecting and Surveying Radio Communications From a Specific Protected Area of Operations in or Around a Compound.

2. Description of Related Art

The twenty-first century has seen a radical increase in the importance of both physical and communications security. Many facilities and operations areas: military bases, intelligence buildings, financial buildings, airports, etc. need greater radio communications security than ever before.

An example of the need for greater radio communications security is the operations area in and around airports. Today someone with a transmitter near the end of an airport runway can cause material damage and loss of life by attempting to disrupt communications between airport towers, TRACONs and the airplanes themselves.

Even traditionally sensitive areas such as military bases and intelligence buildings need the ability to detect and monitor radio communications in various areas inside them. For example, various areas, like prisons, are mandated by their security policy to be off-limits for cell phone use. Isolating and monitoring cell phone transmissions in those areas would automatically enforce the policy.

What is needed therefore in order to enhance radio communications security for sensitive areas of operation is an invention that has 1) The ability to quickly localize and monitor all radio communications, and 2) the ability to be calibrated to instantly determine the location of transmission sources for specific frequencies. Both must be applied to make such a system accurate. The user of this invention can use the system to isolate and monitor transmissions simply by specifying the geographic area of the transmission source to be monitored.

The term "calibration" is used in the Electronic Warfare environment to profile a land or air vehicle-based electronic detection system. The approach used to calibrate such a vehicle is to circle the vehicle with an electronic transmitter. The transmitter is periodically, at known locations, caused to transmit (potentially at different frequency bands of interest). The transmission detection equipment mounted inside of the vehicle is used to detect and record these transmissions. In this manner, blind spots, areas having anomalous reflective characteristics, and any other non-standard signal behavior will be detected and incorporated into the profile of the sensing equipment. Once calibrated, the vehicle's equipment performance is known and should not change unless there are equipment or structural changes made to the vehicle.

This type of calibration has never been done to create a profile for the electronic transmission characteristics of a physical compound or installation. An electronic transmission surveillance system monitoring a physical compound or installation would be much more accurate if the effects of the buildings, equipment, and other such things were known and taken into account by the transmission localizing system. It is this information that is the subject of the present invention.

SUMMARY OF THE INVENTION

In light of the aforementioned problems associated with the prior devices and methods used by today's military organizations, it is an object of the present invention to provide a Method and System for Collecting and Surveying Radio Communications From a Specific Protected Area of Operations in or Around a Compound.

Sensitive operations areas need accurate, efficient, and effective tools to monitor any suspicious transmissions from specified sub-areas. These specific areas to be monitored can be as small as an individual room in a building. A fundamental change in RF detection and monitoring efficiency is needed for the modem organization to achieve and maintain this level of precision for electronic security in its area of operations.

It is an object of the present invention to provide just such a method to automatically detect communications signals in near real time, from any selectable sub-area of a compound. Such a system would greatly enhance the operational capabilities of the twenty-first century organization by providing a real-time capability to secure radio communications in and around a compound. The system should have real time direction-finding methods, such as those espoused by the invention of application Ser. No. 11/201,164. The system has all the abilities of the system described in the '164 application, but is further able to automatically detect the direction of the incoming signals (relative to two or more collector sub-systems in communication with each other as those espoused by the invention of application Ser. No. 11/201,144), and thereafter to add that information to the surveillance decision logic such that the actual geographical location, as adjusted by the calibration information for the particular compound surveillance decision logic.

The preferred system should first have all the abilities of the inventions described by the '164, and '144 patent application. Secondly, the preferred system should have the capability of being calibrated such that the particular RF environment of the compound in question is uniquely surveyed. The calibration tables must be maintained by each network-attached directional collection node of the system invention thereby creating a far more accurate signal geolocation system. Thirdly, the preferred system should be able to automatically pinpoint the geographic area of the source of the incoming signals, to add that information to the monitoring decision logic. Finally, the preferred system should provide a user interface to operators so they can easily select areas to monitor, and easily calibrate the system for maximum precision.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and System for Collecting and Surveying Radio Communications From a Specific Protected Area of Operations in or Around a Compound.

The parent applications to this patent application, namely, Ser. No. 10/829,858, filed Apr. 21, 2004 for "Method and Apparatus for the Intelligent and Automatic Gathering of Sudden Short Duration Communications Signals" and two of its continuation-in-part applications, namely, Ser. No. 11/201,164 filed Aug. 11, 2004 for "Improved Method and Signal Intelligence Collection System That Reduces Output Data Overflow in Real-Time", and Ser. No. 11/201,144 filed Aug. 11, 2004 for "Method and Technique For Gathering Signal Intelligence of All Radio Communications Only Originating From Specific Selected Areas" describe other application environments for the detection apparatus, system and method utilized by the present invention to monitor and localize the electronic emissions in a particular installation or compound. While the inventions disclosed in these three parent patent applications are not associated with the surveillance of a compound (such as is the case with the instant invention/disclosure), the detection systems are essentially the same, and therefore the disclosures contained within those three parent applications are incorporated herein by reference, and will be referred to as the "parent applications" later in this document.

Figure 1:
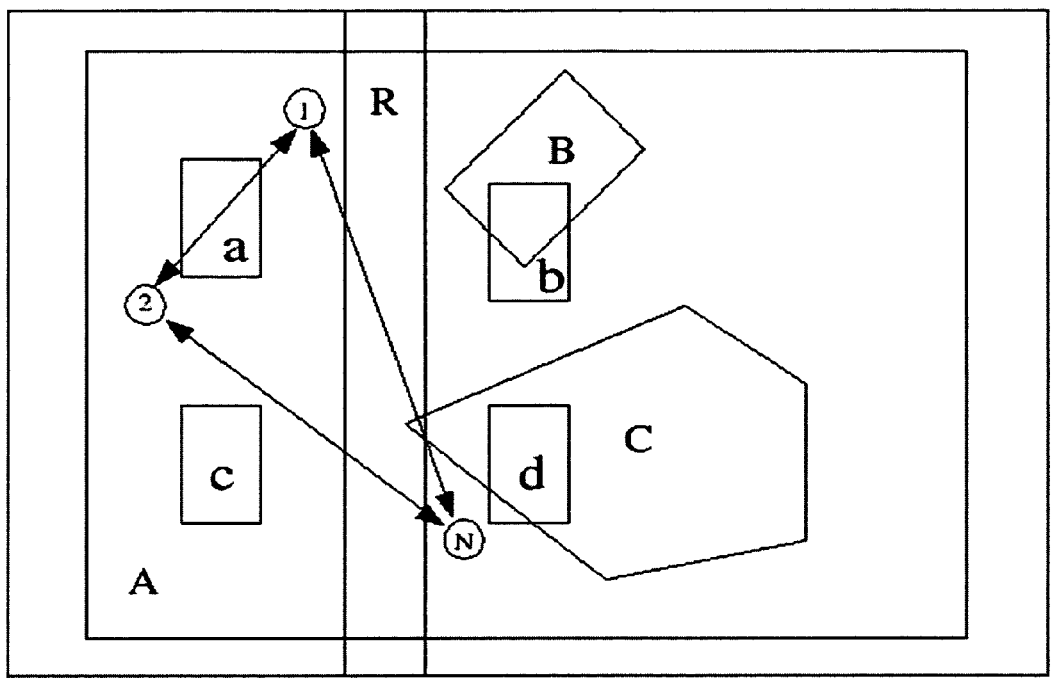
FIG. 1 is a diagram of an area of operations/compound.

The present invention can best be understood by initial consideration of FIG. 1. FIG. 1 is a diagram of an area of operations/compound. It shows the location of three network connected directional collection systems within the compound, along with the location of an area that the user's security policy says to monitor. The directional collection systems are numbered 1, 2, and N, each with directional signal collection capability as described below. Area A is the area of interest (i.e. the compound), areas B and C are the areas to be monitored. Areas a, b, c, and d are actual buildings in the compound (or military base). R is the road between the buildings.

The depicted scenario includes three network-attached directional receiving systems, along with outlined areas of interest. In this scenario, the system user could choose to monitor any of the three "sub-areas" A, B, and C. Sometimes the user would want to monitor the entire compound (area A) at a certain frequency, but the typical situation involves monitoring only specific sub-areas. So if only sub-areas B and C of the compound are to be monitored, then the system operator enters the geographic coordinates of those areas for the system to monitor. The system then monitors and records primarily signals transmitted from areas B and C. Any transmissions from areas outside of B and C may be ignored by the system.

Figure 2:
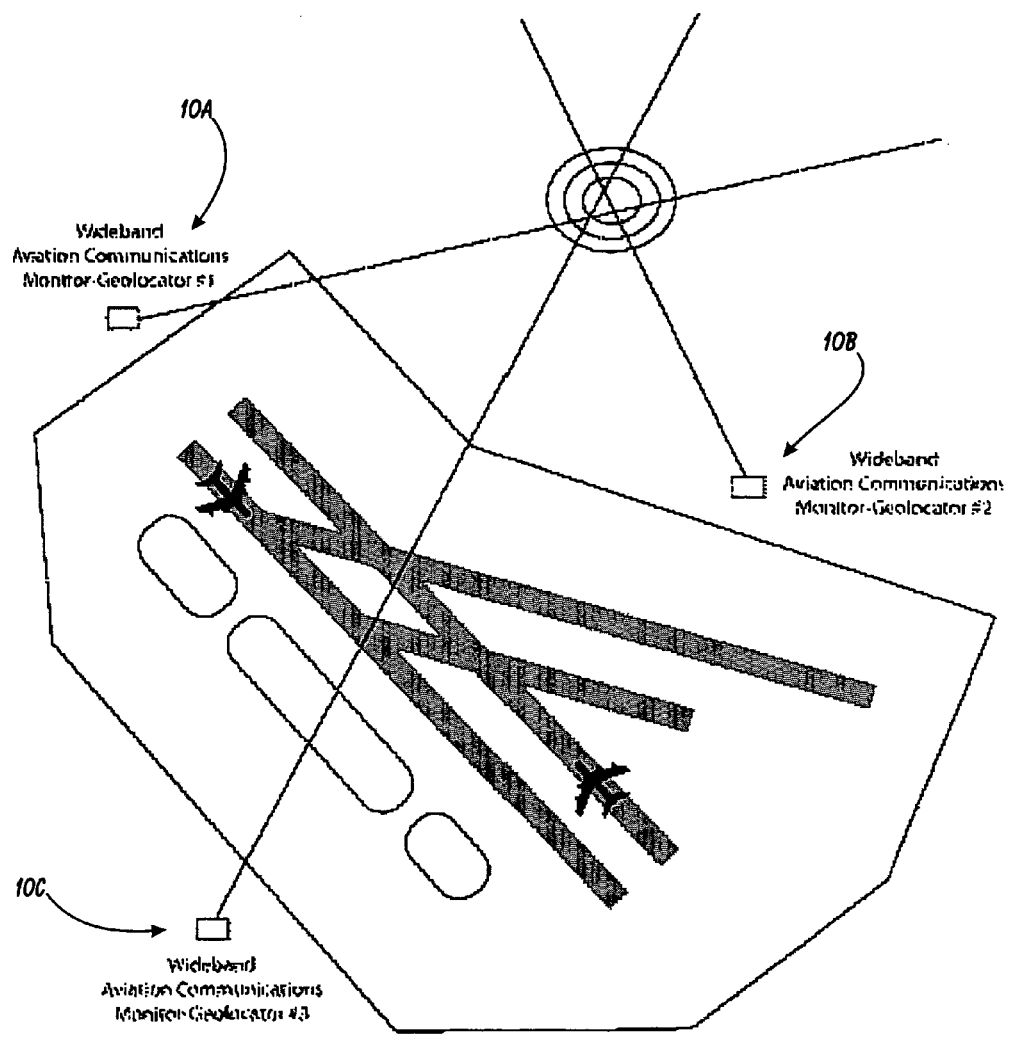
FIG. 2 is another diagram of a protected compound, in this case an airport.

FIG. 2 is another diagram of a protected compound, in this case an airport. The sketch is much like FIG. 1, with the network connected directional collection systems (specifically 10A, 10B and 10C—identical versions of the system 10 described elsewhere in this disclosure) distributed around the airport's property. Interfering RF transmissions coming from areas near the runways or around the outlying neighborhood can be detected and located in real time. In addition, the signals are demodulated and stored for evidence purposes of criminal court trials, should an individual purposely interfere with airport operations.

Figure 3:
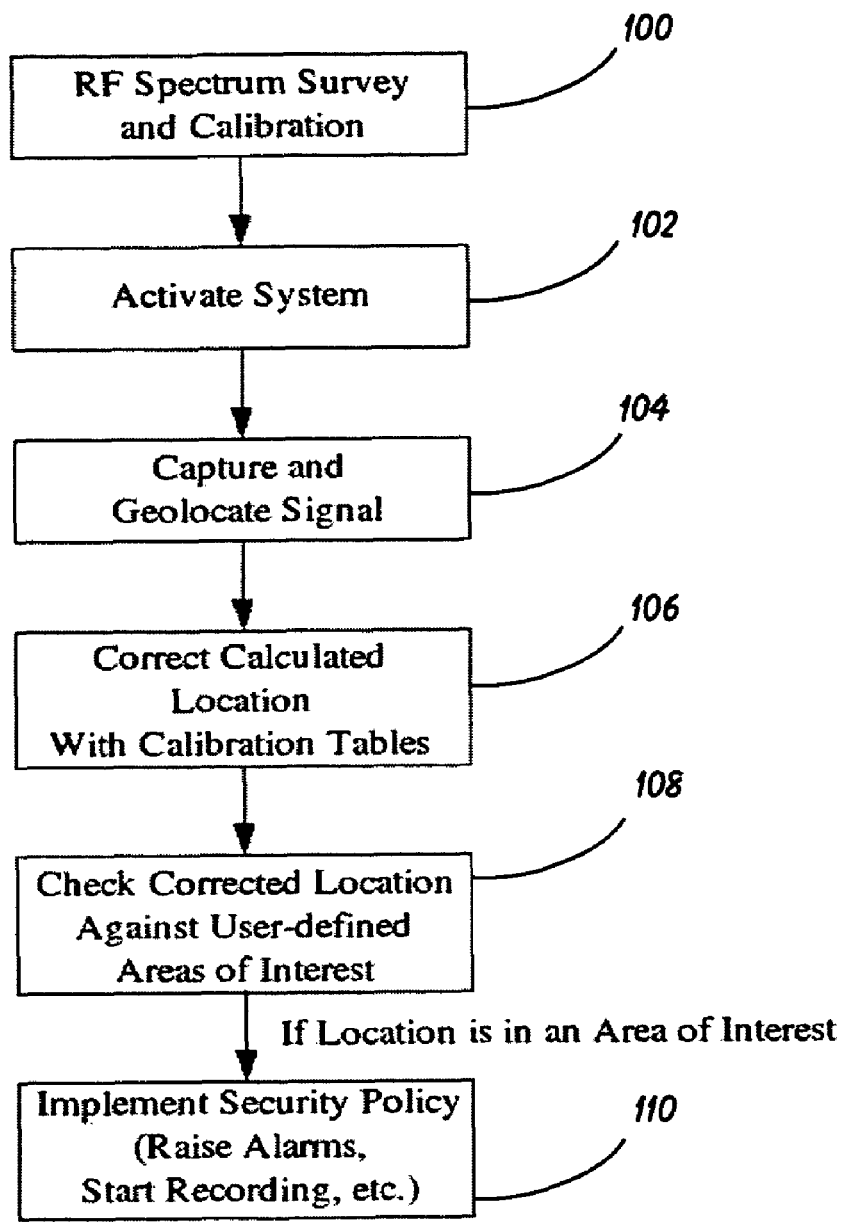
FIG. 3 is a flowchart depicting the operational method of the calibrated system of the present invention.

FIG. 3 is a flowchart depicting the operational method of the compound-monitoring system of the present invention. The first and most important step in the flow of operations is to calibrate the system 100 for the most precise detection of the location of signal sources. This calibration 100 is done via a careful survey of the compound area to be monitored. The survey is performed repeatedly—once at the time of system installation, and then every so often to test the ongoing effectiveness of the system. The survey allows the system to adjust the geolocation calculations for the behavior of multipath reflections and signal absorptions of the radio communications signals. Thus the surveys calibrate the system to match the exact compound environment.

Each system installed in each compound must be calibrated in the same manner to become familiar with the compound's unique and specific radio environment. Calibration of the system for each and every compound is of importance to maintain a high degree of accuracy for each compound. The system is therefore customized to detect and recognize signals for each sensitive area of each compound. Of course, if either the security needs or the radio environment changes sufficiently, the system can be re-calibrated. For example, if extra buildings are put in the compound the system should be re-calibrated to account for the changed multipath environment.

Figure 5:
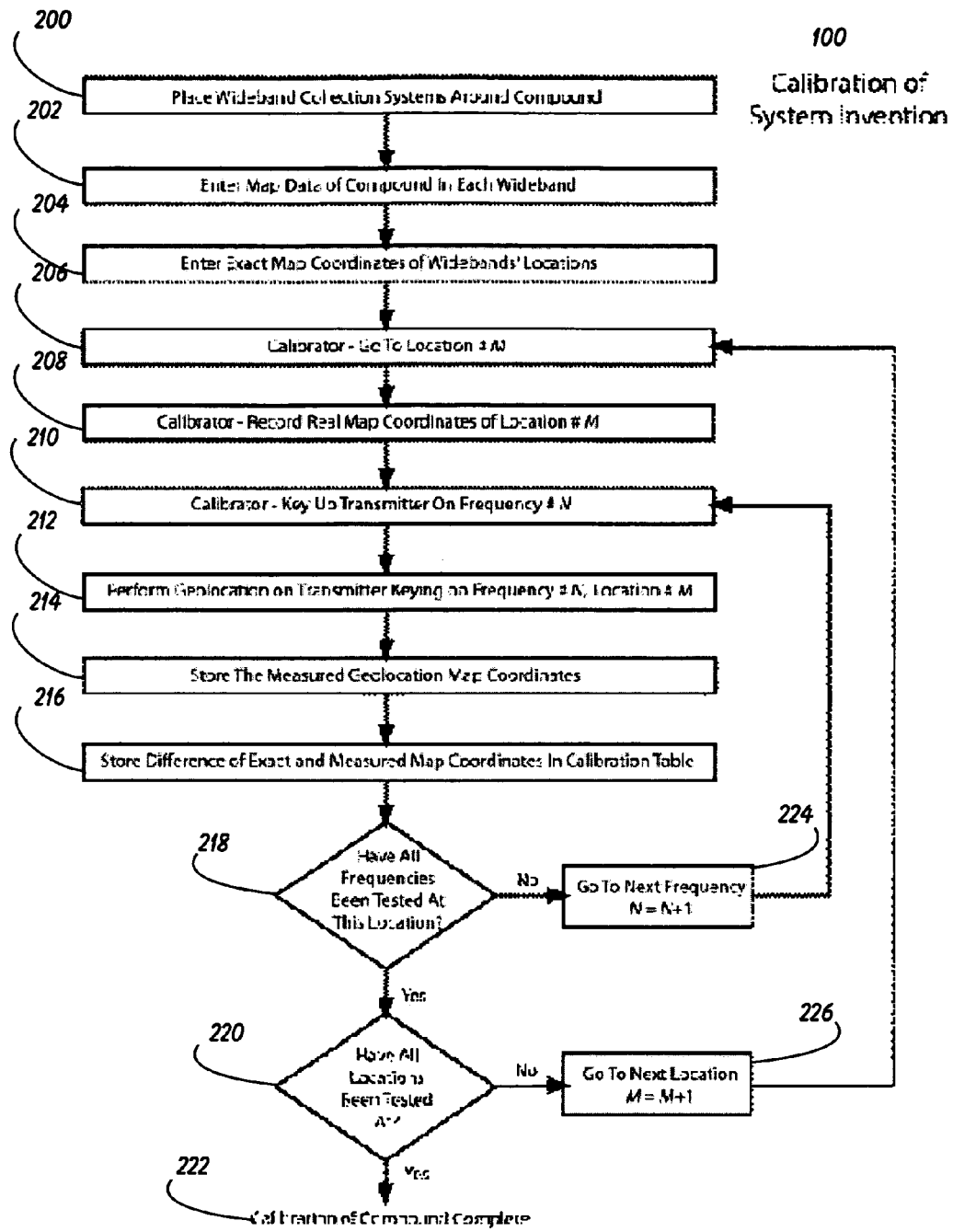
FIG. 5 is a flowchart depicting the preferred method for calibrating the system of the present invention.

The survey is outlined by FIG. 5, and produces a location calibration table for each respective directional wideband collection node 10. First, each node 10 stores its exact location, for input to the geolocation calculations. Each node also stores a map of the compound, for the operator to reference through a user interface at the node.

The operator of the system then initializes the system with all the location data of the operations area, the areas to be monitored. For simplicity and ease of use, the operator uses a GUI-based map to indicate these parameters to the system. A few mouse clicks are sufficient to easily set up the system to operate effectively.

The operator then activates the system 102. The system starts monitoring the various areas specified. The individual directional monitoring systems behave as described in the aforementioned parent applications to this disclosure.

Once any transmission in the frequency band of interest is detected, the location is determined 104. Then the location is corrected with the calibration table 106. Correcting the location means to access the empirical data within the calibration table, and comparing the apparent location of the detected signal to that empirical data. Through interpolation and/or extrapolation, the error found in the calibration data can be applied to the data of the apparent signal in order to determine a best estimate of the transmitter's actual location.

The corrected/calculated location is then compared to the sub-areas of the compound that were preset to be monitored 108. If the system determines that the signal meets preset criteria, the system then implements the security policy by sending an alarm to the GUI controls, starting to record the transmission, and so forth 110. The GUI can be set up to effect both audio and visual alarms; the security staff can then be scrambled to deal with the source of the signal.

The system of this invention can be very precisely tuned over time to minimize, automatically, the number of false alarms raised by the system. Thus the accuracy and effectiveness of the system avoids waste of resources, especially the human resources of the security staff.

Figure 4:
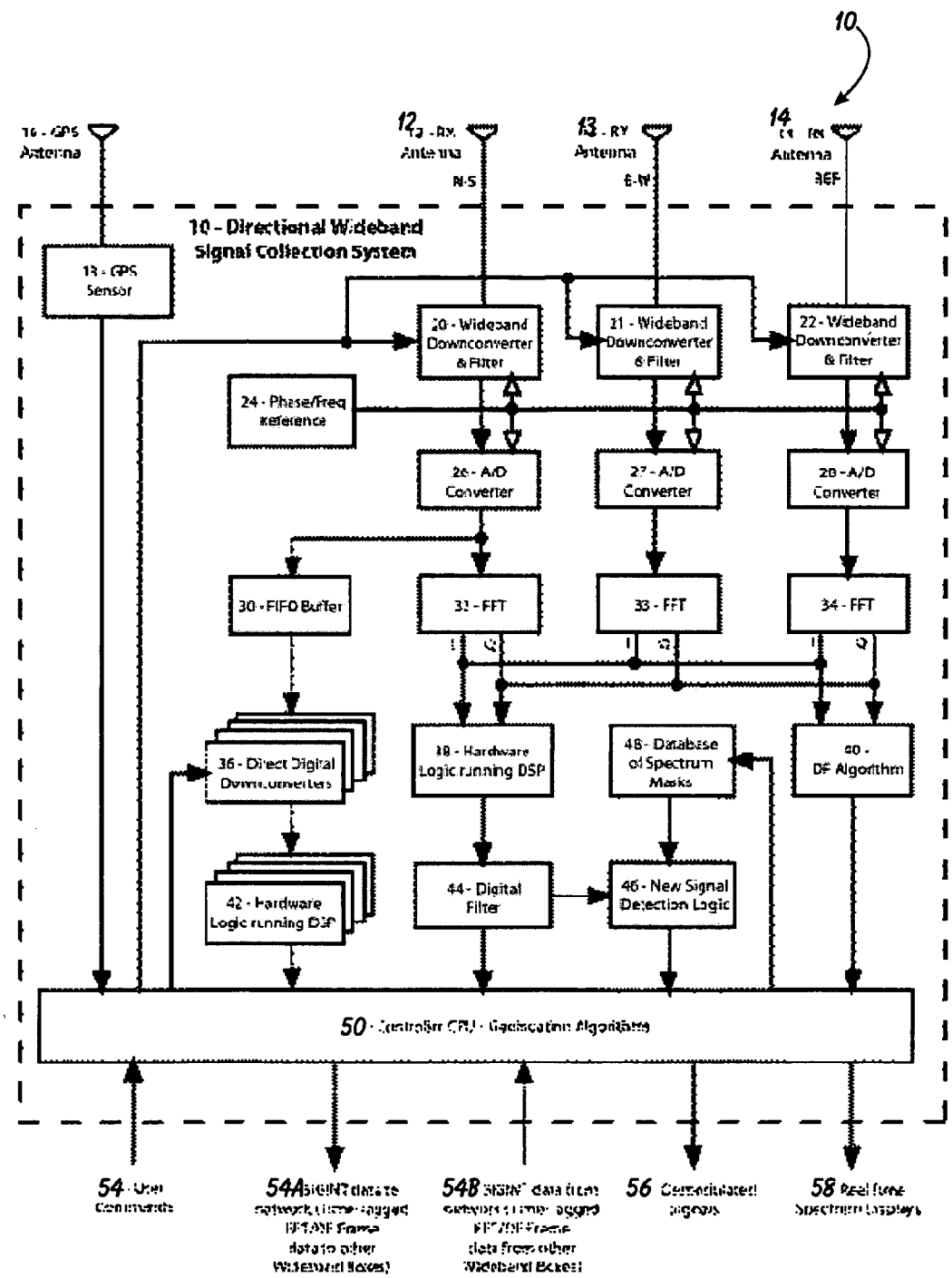
FIG. 4 is a drawing of a directional collection node of the present invention.

If we now turn to FIG. 4, we can more closely examine the equipment that is actually doing the signal detection, analysis and geolocation.

FIG. 4 is a drawing of a directional collection node of the present invention 10 (the generic device referred to as 10A, 10B and 10C in FIG. 2). A network of collection nodes 10, plus specialized calibration tables and software, comprises the system of the present invention. In brief, the collection nodes 10 are identical in hardware, software, and behavior to the wideband collection boxes described in the patent application Ser. No. 11/201,164 filed Aug. 11, 2005, "Improved Method and Signal Intelligence Collection System that Reduces Output Data Overflow in Real-Time." Multiple instances of the previous invention can be installed throughout a compound, and networked together to provide triangulation data for specific areas of the compound. The operator of the combined system can specify areas within the secured compound that are to be monitored, and the system will automatically monitor or sound alarms on sudden occurring signals whose sources lie in those respective areas.

DIAGRAM 4 REFERENCE NUMERALS

10 Network-Attached Directional Wideband Signal Collection System Node
  12, 13, 14 Receiving DF Antennas
  16 GPS Antenna
  18 GPS Receiver
  20, 21, 22 Wideband Downconverters and Filters
  24 Phase/Frequency Reference
  26, 27, 28 Analog-to-Digital Converters (AID)
  30 FIFO Buffer
  32, 33, 34 Fast Fourier Transformations (FFT's)
  36 Direct Digital Downconvertors
  38 Hardware Logic DSP
  40 DF Algorithm
  42 Hardware Logic DSP
  44 Digital Filter
  46 New Signal Detection Logic
  48 Database of Spectrum Masks
  50 Controlling CPU with Geolocation Algorithms
  52 User Commands
  54A SIGINT data to network (Time-Tagged FFT/DF Frame data to other Wideband Boxes)
  54B SIGINT data from network (Time-Tagged FFT/DF Frame data from other Wideband Boxes)
  56 Demodulated Signals
  58 Real-time Spectrum Displays Now turning to FIG. 5, we can examine the "calibration" method that provides so much value through the system described above. FIG. 5 is a flowchart depicting the preferred method for calibrating the system 100 of the present invention.

Most important and unique to this invention is the method described herein for security personnel to survey the radio characteristics of a specific compound. The security personnel can walk around a specific compound, into its most sensitive areas, and key up various transmitters, on various frequencies, from each area. The wideband collection nodes of the networked system then detect and record the transmission from each transmitter, from each sensitive area, for later recognition of a recurrence of the use of that frequency from the specific sensitive area. Thus the entire system is finely calibrated to look for and recognize specific transmission frequencies from specific sensitive areas of the compound or from within a specific offices in a building. Multipath reflections and obstructions are calibrated into the system. This is a very unique approach as compared to the conventional electronic warfare/detection system. In the typical system, such as those described by the parents to this application, unknown and unlocated transmitters are sought to be identified (as friend, foe or unknown) by a located transmission. Here, the use of the calibration tables changes that process to one of comparing unknown transmission to known locations (possibly with some extrapolation or interpolation depending upon the granularity of the calibration data) to adjust the apparent location to a known location by applying a calculated correction to the apparent geolocation.

System calibration must be performed for every compound in which the system is installed. The calibration corrects the discrepancies between the calculated and the actual (or apparent) location of the source of a signal. Each compound is physically different, and will reflect and block the frequency transmissions in various ways. These reflections will cause errors to accumulate in the geolocation calculations in each wideband collection node (i.e. each node will very likely experience its own unique error for each discrete transmission location within the compound). The differences between the calculated and the actual locations are therefore stored, indexed by location and frequency, in the calibration table of each respective wideband node.

The method of FIG. 5 assumes that enough collection nodes receive each signal, so that a triangulation can be calculated. If the calibration step reveals any areas from which a signal cannot be received by enough collection nodes for triangulation ("blind spot"), additional nodes must be added to the network to cover those areas.

All of the processing that occurs in the invention runs in near real-time, fast enough to react to even fast frequency-hopping transmitters or cell phones. This invention is unique since no other system has the capability or performance to perform these operations this quickly and accurately.

Once the collection systems 10 are placed in and/or around the compound 200, each node 10 has a map of the compound entered into it 202. On each of these internal maps, the exact map coordinates of each node is also entered 204.

Then, or at any time prior to the next step, security personnel determine the frequencies of interest for each sensitive location. These frequencies could be cell phone frequency bands, wireless network frequency bands, and so forth. The variable N in FIG. 5 stands for the number of frequencies of interest, for each sensitive location.

The security personnel also must determine the number of locations to calibrate the nodes for. If a particular sensitive area in the compound is large, a number of location readings may need to be done in the area. The personnel must determine how fine a location resolution is needed to provide adequate coverage and security. The variable M in FIG. 5 stands for the total number of locations to take readings The security personnel then walk the compound, to each of the M locations 206. The personnel bring a transmitter with them that can transmit each of the N frequencies of interest for each location. At each location M, the actual geolocation of location M is recorded 208. The calibrating personnel then key up the transmitter while the monitoring system is collecting data 210. Each of the N frequencies is transmitted in turn 218, 224, 210, allowing the collection nodes to triangulate on its signal 212. Both the calculated locations and the exact locations for each frequency N are then stored in the calibration table in each node 214. The process is repeated for each of the M locations 220, 226, 206.

The calibration table allows each node to locate, very precisely, the transmission source of a frequency of interest transmitted from a sensitive area. The precision of the system is limited by the resolution of the survey (referred to as the "granularity" of the calibration table); the survey must be as complete as possible, so the calibration step is important. The calibration is also ongoing, as more and more frequencies and locations are added to each node's lookup table. The nodes can then alert security personnel of the location of the transmission of any frequency of interest, with very few false alarms. The system automatically knows the area the transmitter is being used, down to the specific room in a building. Information this accurate and this automated is very powerful in the enforcement of electronic security in sensitive areas and is only possible through this calibration step and method.

The ongoing survey is the repeated testing of the system's monitoring effectiveness. Again, a transmitter is carried around the area of operations, and is keyed up in each area to be monitored. The system is then checked to ensure that the new signal is detected as unusual, and localized very precisely. This survey and calibration should occur at the time intervals specified by the security policy. This ongoing survey also detects whether the radio environment has changed enough over time to cause parts of the system to be re-calibrated.

This approach yields an enhanced electronic information security capability for radio communications in and around specific areas of operations, especially areas of significance to national security (such as military bases, intelligence buildings, government buildings, airports, special events, etc.). This state-of-the-art invention allows users to isolate and monitor the radio communications in these specific sensitive areas (compounds) of operations. These areas can be large or small, from large airport facilities down to specific areas within buildings (to the exact office). Operators of the invention can survey an individual compound's radio characteristics and calibrate the system precisely for the characteristics of each individual compound. Thus this invention greatly enhances the electronic information security capabilities of sensitive areas of operation, both civilian and military.

Thus this invention is unique in its ability to be applied to a wide range of operations areas that require very tight, precise radio communications monitoring and security. It is also unique in that it fine-tunes the monitoring of the system to match the operation area's physical building or location layout. The system can be precisely calibrated to detect the exact location of the source of specific frequency transmissions from specific sensitive areas in the compound. This invention is therefore vital to the interests of United States national security.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A directional electronic signal geolocation and identification system, comprising:
   a wideband signal collection front end subsystem, comprising:
   a wideband receiver for receiving RF signals transmitted by an RF signal transmitter across a broad spectrum said receiver comprising first, second and third antennae means for receiving RF signals simultaneously, said antennae means in geographically spaced relation;
   a digitizer for creating an individual continuous stream of digitized data representing each said antennae means' received RF signals;
   a digital data conversion means for converting said individual digitized data stream into FFT frequency bins by individual stream;
   direction determination means for determining a direction from each said antennae means to said RF transmitter; and
   apparent location determination means for determining an apparent location of said RF signal transmitter from said determined directions;
   a signal evaluation logic module, comprising:
   a comparing means for comparing each said frequency bin to configurable preset lockout frequency bins;
   a peak detection means for evaluating and calculating the amplitude value for each bin by using a configurable number of data point samples for each of those bins;
   a windowing means for evaluating and calculating the amplitude value for each bin by using a configurable number of data point samples for each of those bins; and
   geographical location correction means for determining a corrected geolocation of said RF transmitter, said geographical location correction means comprising correction means for comparing said apparent location to a calibrated apparent location to determine a corrected geolocation of said RF transmitter.

2. The system of claim 1, further comprising policy enaction means for enacting response policy responsive to said corrected geolocation and said converted digitized data streams.

3. The system of claim 2, wherein said policy enaction means is further responsive to user-defined areas of interest.

4. The system of claim 3, wherein said system further consolidates said individual frequency bins from said wideband signal collection front end subsystems representing said individual digitized data streams into a single frequency bin.

5. The system of claim 4, wherein said digital data conversion means comprises means for converting said digitized data from a time domain to a frequency domain.

6. The system of claim 5, wherein said digital data conversion means comprises means for converting said frequency domain converted data from separate real and imaginary components to normalized amplitude data.

7. The system of claim 6, wherein said normalized amplitude data is categorized by frequency bins.

8. The system of claim 7, wherein said comparing means comprises comparing data in said frequency bins to frequency lockouts.

9. The system of claim 8, further comprising peak detection means for evaluating the amplitude of said frequency bins.

10. The system of claim 9, wherein said windowing means for evaluating each bin to be within configurable amplitude bound limits.

11. The system of claim 10, further comprising means for comparing said amplitude-evaluated signal to a pre-established signal priority list.

12. The system of claim 11, wherein said signal priority logic means further compares said amplitude-evaluated signal to a real-time priority request.

13. The system of claim 12, wherein said first, second and third antennae means are in geographically fixed locations less than or equal to one mile from one another.

14. A method for geolocating RF signal transmissions, comprising the steps of:

creating a calibration table, said calibration table including apparent transmitter location, actual transmitter location and transmitter frequency;

detecting an analog RF signal transmission emanating from a signal transmitter at a wideband signal collection front end system, each said detected RF signal transmission first having been received by first, second and third antennae means associated with said said wideband signal collection front end system, said antennae means located in geographically spaced relation to the other antennae means associated with that said system;

digitizing each said detected RF signal transmission into first, second and third digitized signals;

converting said each digitized signals into first, second and third frequency bins;

analyzing phase characteristics of each said digitized signal;

determining a detected apparent geographical location of said signal transmitter responsive to said analyzing; and comparing said detected apparent geographical location to said apparent transmitter location data of said calibration table to arrive at a corrected location responsive to said comparing and said calibration table actual transmitter location data.

15. The method of claim 14, wherein said calibration table creating step comprises:

activating said wideband front end signal collection systems;

positioning an RF transmitter at a known geolocation within a compound;

transmitting a desired frequency from said RF transmitter;

detecting said transmitted signal;

determining an apparent transmitter location by triangulating said detected signal by said antennae means;

determining an actual transmitter location; and recording said apparent transmitter location, said actual transmitter location and said transmitted signal frequency in said calibration table.

16. The method of claim 15, wherein said calibration table creating step comprises repeating said transmitting, detecting, apparent transmitter location determining, actual transmitter location determining and said recording steps for a group of frequencies of interest.

17. The method of claim 16, wherein said calibration table creating step comprises repositioning said RF transmitter to a plurality of known locations within said compound and repeating said transmitting, detecting, apparent transmitter location determining, actual transmitter location determining and said recording steps for said group of frequencies of interest at each said known location within said compound.

* * * * *